United States Patent [19]

Conn

[11] E Patent Number: Re. 32,570

[45] Reissued Date of Patent: Jan. 5, 1988

[54] TILT DETECTOR

[75] Inventor: Worth R. Conn, Garland, Tex.

[73] Assignee: Detectors, Inc., Graham, Tex.

[21] Appl. No.: 841,105

[22] Filed: Mar. 13, 1986

Related U.S. Patent Documents

Reissue of:

[64] Patent No.: 4,438,720
Issued: Mar. 27, 1984
Appl. No.: 346,559
Filed: Feb. 8, 1982

[51] Int. Cl.[4] ..... G01C 9/10

[52] U.S. Cl. ..... 116/215; 33/365; 33/379

[58] Field of Search ..... 116/215, DIG. 13; 33/365, 377, 379; 340/689

[56] References Cited

U.S. PATENT DOCUMENTS

| | | | |
|---|---|---|---|
| 2,674,221 | 4/1954 | Tinsley | 116/215 |
| 3,486,238 | 12/1969 | Hansen | 33/379 X/ |
| 3,497,950 | 3/1970 | Squire et al. | 33/379 X |
| 3,880,108 | 4/1975 | Anton | 116/215 |
| 3,923,000 | 12/1975 | Cloyd | 116/215 |
| 3,926,144 | 12/1975 | Lander | 116/215 |
| 4,135,472 | 1/1979 | Chesla et al. | 116/215 |

*Primary Examiner*—James L. Rowland
*Assistant Examiner*—Brian R. Tumm
*Attorney, Agent, or Firm*—James C. Fails; Wm. T. Wofford; Arthur F. Zobal

[57] ABSTRACT

A tilt detector for accompanying goods to be transported to determine when the goods have been transported in a recommended position without being inclined at an angle greater than a pre-determined angle characterized by a first fluid of a first density, a second fluid of a second density, a horseshow shaped baffle with a trapping end in the form of an inner apex for trapping the second mass under the force of gravity when in a vertical position with its opening end in the opposite direction such that at least a part of the second mass is freed to move out of the baffle when it is tilted beyond a pre-determined angle of tilt; the degree of the sides of the baffle being related to the pre-determined angle of tilt, and a thin container having at least a transparent window for viewing at least the trapping end of the horseshoe shaped baffle for ascertaining if the second mass has been freed such that the tilt detector can be affixed to goods, containers and the like to tell if they have been tilted too much.

17 Claims, 11 Drawing Figures

TILT DETECTOR

Matter enclosed in heavy brackets [ ] appears in the original patent but forms no part of this reissue specification; matter printed in italics indicates the additions made by reissue.

This invention relates to a detector for accompanying goods to be transported to determine whether the goods have been transported in a recommended position and have not been inclined at an angle greater than a predetermined angle. More particularly, this invention relates to a combination in which one or more tilt detectors are affixed exteriorly of a container for goods to enable recipient to rapidly ascertain if the correct position has been maintained during transport.

DESCRIPTION OF THE PRIOR ART

There are many goods, materials, manufactured articles and the like which require that they be transported in a certain position. In the early days, the only means of fulfilling this requirement was the stenciling of certain instructions onto the crates to maintain the pre-determined position. These precautions frequently proved to be insufficient since it was common for the materials to be received at their destination in a damaged condition. Moreover, there always remained the possibility that the maximum angle of inclination had been violated during shipment but that the goods had been restored to their correct position such that they would later operate incorrectly because of the shipping problems. Specifically, shipping problems arise when a package of such goods was tilted more than the pre-determined maximum angle. For example, computerized telephone switching modules represent such a case in point. The modules cannot be made insensitive to a suspension in any orientation except in the upright position. As these modules are shipped a tilting angle by only 30°–45° can damage the module with its printed circuitry.

What is needed, therefore, is a device that indicates on the arrival of the materials at their destination whether or not they have been transported in the recommended position or have been tilted beyond the maximum pre-determined angle. There are relatively few devices made and marketed that have been designed to give an indication of such tilting. Such devices have had drawbacks; for example, a lateral impact or acceleration will usually activate the device into its original position, or cause it to indicate a tumbled condition. Although the impact, or acceleration, may or may not be sufficient to cause damage to the contents of a container, these prior art devices would not differentiate between such impact and improper tilting.

Moreover, it is desirable that the tilt detectors not be resettable. In particular, it must be possible to combine a package with at least a pair of the tilt detectors such that attempting to reset one would cause the other to be tilted beyond its pre-determined maximum angle so that the total combination would always afford an indication that the tilt beyond that allowed had been effected. Yet, for the detectors to be reusable, it is desirable that they be resettable with care and on an individual basis.

SUMMARY OF THIS INVENTION

Accordingly, it is an object of the present invention to obviate the disadvantages of the prior art and provide a tilt detector that will indicate readily, even through a casual inspection, when a tilt beyond a predetermined angle has been experienced by a package, or goods being transported.

It is a specific object of this invention to provide a combination of a container and a pair or more of the tilt detectors that will indicate not only that a tilt has been experienced, but prevent resetting of the tilt detector.

These and other objects will become apparent from the descriptive matter hereinafter, particularly when taken in conjunction with the appended drawings.

In accordance with this invention, there is provided a tilt detector, or a combination of a container with two or more tilt detectors affixed thereto, to afford the indication that the goods that have been transported have been inclined more than a pre-determined angle, each tilt detector being characterized by:

a. a first fluid of a first density;

b. a second mass of a second density;

c. a horseshoe shaped baffle with a trapping end in the form of an inner apex for trapping the second mass under the force of gravity when in the vertical position on the container and with its opened end opening in the opposite direction of said trapping end such that at least a part of the second mass is freed to move out of the baffle when tilted beyond a pre-determined maximum angle of tilt; the degree of the sides of the baffle being related to the pre-determined angle; and d. a thin container having at least a transparent window for viewing at least the trapping end for ascertaining if the second mass has been freed;

such that the tilt detector can be affixed to the goods, shipping packages and the like and indicate to the recipient that they have been tilted too much.

In preferred embodiments, the thin container has a chamber extending around the horseshoe shaped baffle such that the second mass will traverse around the baffle so as to prevent its being readily trapped again. A variety of different approaches in which the second mass is more dense than the fluid and less dense than the fluid are specifically described.

DESCRIPTION OF PREFERRED EMBODIMENTS

Figure 1:
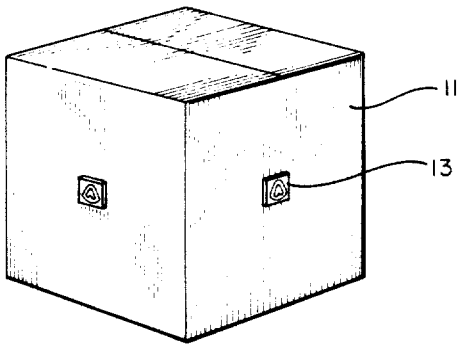
FIG. 1 is an isometric view of one form of the combination of this invention.
Figure 2:
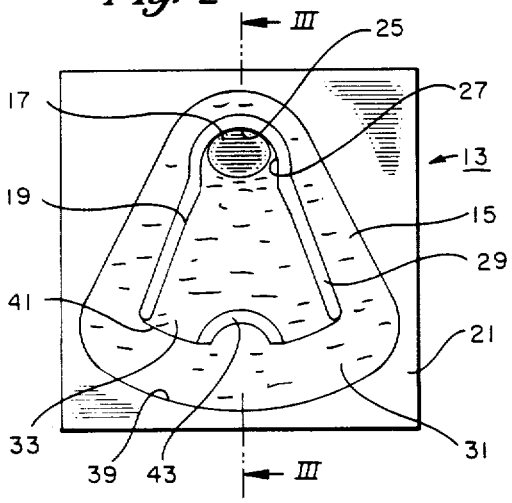
FIG. 2 is a front elevational view of one of the tilt detectors of FIG. 1.

Referring to FIGS. 1 and 2, a shipping package 11 has a pair of the tilt detectors 13 affixed on the exterior walls thereof for monitoring whether or not the goods have been maintained in their recommended position during shipment and not tilted beyond a pre-determined maximum angle that might result in damage. The shipping package 11 may be any of the conventional forms; such as, crates, pallets and superstructures, corrugated pasteboard containers and even plastic and metal containers that are emplaced about the goods before shipment. The tilt detectors are preferably placed on upright walls of the shipping package in their upright position and such that they form an angle of about 90° with respect to each other. With this preferred combination, if one of the tilt detectors records that a tilt beyond a certain pre-determined maximum angle has been experienced, it cannot be arighted, or returned to its normal position, without tilting the other tilt detector beyond its maximum position. Accordingly, this affords a positive indication to the recipient if a tilt beyond the maximum allowable angle has been experienced. The recipient has merely to look at the two tilt detectors to ascertain if his package is acceptable to sign for the delivery.

Figure 3:
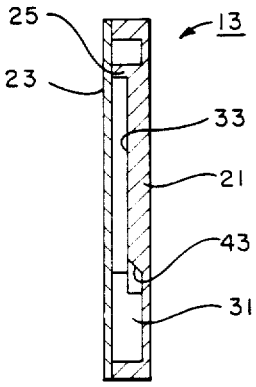
FIG. 3 is a cross-sectional view taken along the lines III—III of FIG. 2.

Each tilt detector 13 comprises a first fluid 15 of a first density, FIGS. 2 and 3; a second mass 17 of second density; a horseshoe shaped baffle 19 and a thin container 21 having at least a transparent window 23, FIG. 3.

The first fluid 15 must inert with respect to the baffle 19 and the container 21. The first fluid 15 may comprise a gas or a liquid. Typical of the gases are air, fluorinated hydrocarbons like Freon, and inert gasses like nitrogen, carbon dioxide, argon, and neon. The gases should have a high enough vapor pressure that there is no danger of condensation even when the container may be shipped into low temperature areas. For example, the gas should resist condensation at temperatures as low as −40° F. (−40° C.). Sealing of gases within the container ordinarily presents relatively few problems. With respect to a liquid, the liquid should be inert with respect to the material of which the container in the baffle is made. The general requirements for a liquid are:

1. a melting point of about −40° F. (−40° C.);
2. a boiling point of about 212° F. (100° C.) and
3. a flash point of about 100° F. (37.8° C.).

The liquid should have a low toxicity and be relatively nonflammable or have the flash point of at least 100° F. as indicated. Typical of the range of liquids are aqueous solutions containing suitable antifreeze to the fluorinated hydrocarbon liquid such as Flourinert. Typical antifreezes that would be added to aqueous solutions to prevent their freezing would be ethylene glycol, diethylene glycol, triethylene glycol, and propylene glycol. Since there are relatively small quantities of the liquid that are employed in the tilt detector, it may be possible to employ liquids such as ethanol, propanol, and even hydrophobic material such as the light oils, glycerine, or silicone oils. Preferably the liquid is dyeable so that it can be made more visible and show more readily when the second mass has been displaced, as by tilting too much.

The second mass may comprise a fluid of different density from the first fluid and immiscible therewith, or it may comprise one or more solid elements. For example, the second mass may comprise an air bubble or bubble of the other gas delineated hereinbefore as long as it remains inert to the liquid and does not dissolve in the liquid employed as the first fluid. As will be appreciated, a gas is not employed as the second mass if a gas is employed as the first fluid. If the second mass comprises a liquid bubble of a different density from the first fluid, the second mass liquid bubble must be sufficiently different in density to respond rapidly to gravity if the tilt detector is tilted too much. For example, a light hydrocarbon oil bubble can be employed within a dyed water first fluid with the horseshoe shaped baffle opening downwardly to trap the bubble similarly as with an air bubble. Conversely, a liquid aqueous solution bubble can be employed in a less dense light oil with the horseshoe shaped baffle inverted and opening upwardly in its vertical operational position. On the other hand, the second mass may comprise solid elements such as disks or small pellets. If a disk is employed, ordinarily a single disk is satisfactory. The disk may be more dense or less dense than the fluid and the baffle oriented in the respective directions as discussed hereinafter. For example, the disc may be made of inert material like glass, ceramic, inert metal or inert plastic such as of Nylon, Delrin, polyurethane, polystyrene, polypropylene, acrylonitrile butadiene styrene copolymer (ABS), polyvinyl chloride (PVC) or the like. Similarly, a plurality of small pellets can be employed as the second mass. These pellets, similarly as with the disks may be formed of the same material that is inert to the first fluid. Similarly as described hereinbefore, if the pellets are more dense than the first fluid, the horseshoe shaped baffle will open upwardly to catch the pellets or disk; whereas if the pellets are less dense than the fluid, the horseshoe shaped baffle will open downwardly.

The baffle 19 may be formed of any material such as metal or plastic. Preferably it will be formed integrally with one of the walls of the container and will be of the same material as the container to facilitate economical molding, machining, and the like. The baffle may be in the form of a V-shape or, as indicated, a modified horseshoe shape. In the indicated modified horseshoe shape, the inner apex 25 is in the form of a semicircle, FIGS. 2 and 3, that traverses completely between the front and back walls of the container 21 so as to afford a trap for the second mass. The dimensions of this semicircle may vary significantly depending upon what the nature of the first fluid and the second mass are. It has been found advisable to employ a semicircle having a radius in the range of 0.1–0.3 inch when the first fluid is a liquid and the second mass is a gas bubble. The inner apex also includes a relatively straight neck 27 extending from the semicircle 25 of the inner apex toward the open end of the baffle 19. The baffle 19 then flares outwardly with the angle of the sides 29 being related to the critical angle beyond which tilting will be registered by escape of the second mass 17. The wall forming the neck and the sides 27, 29 also extends completely between the front and back of the container so as to afford a trap for the second mass 17. The length of the neck will be about the same dimensions as the radius of the semicircle and within the range of 0.1–0.3 inch when the second mass is a bubble of gas disposed interiorly of the liquid fluid in the chamber 31 in the container 21.

Specifically, a chamber 31 is disposed about the baffle 19 such that the escaped second mass is free to traverse a sort of raceway about the baffle and prevent its being returned to the baffle for resetting easily. To prevent easy resetting, a platform 33, FIG. 3, forms a raised inner portion of the baffle. This is advantageous in two respects. First, it provides a thinner space between the wall of the platform and the front surface such that any gaseous bubble will be expanded to become more readily visible in the inner apex, or semicircle 25. Secondly, it prevents ready entry of the gas bubble back into the baffle such that the bubble tends to traverse around the raceway. The bubble will, of course, be smaller in lateral dimensions when displaced out into the raceway of the chamber 31.

Figure 6:
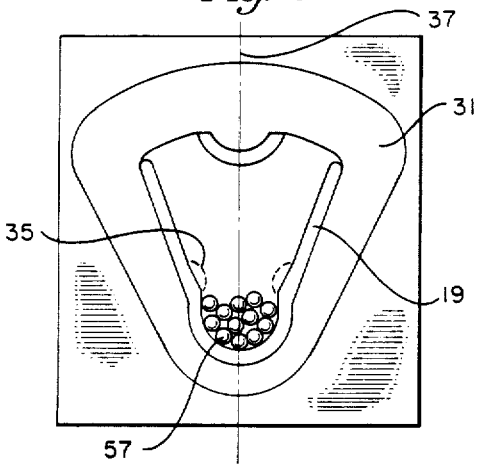
FIG. 6 shows an embodiment of the tilt detector in which a plurality of small pellets are more dense than the fluid in the chamber.

The flared sides of the baffle may range from as low as 45° to as much as 75°. The flaring may come in one or a plurality of stages. For example, as illustrated in FIG. 6 in dashed lines, the outwardly flaring walls have a first flare 35 in range of 35°–50°; for example about 45°; with respect to the central axis 37. This tends to afford an impetus to the second mass to escape once the tilt has been achieved. The bottom portion 39 of the chamber is arcuate. Preferably, it is parallel with the arcuate bottom 41 of the platform 33. The bottom of the platform may have a radius in the range of 0.5–0.9 inch from the center of the semicircle of FIGS. 2 and 3 when a bubble of gas is employed within a liquid first fluid. For example, about 0.75 inch radius has been found to be satisfactory.

To assist in reactivating or resetting the tilt detector, an inclined, arcuate portion 43, FIGS. 2 and 3, provides an incline that enables trapping the bubble if handled carefully and forcing it to reenter the baffle 19. For example, the tilt detector may be laid substantially horizontal and worked to orient the bubble in the vicinity of the portion 43 and thereafter carefully raising the top of the tilt detector 13 to its vertical position forcing the bubble into the space between the platform 33 in the front surface 23.

The front surface 23 is at least transparent in the vicinity where the second mass will be. Preferably, it is transparent over all of its surface such that the orientation of the second mass can be readily determined. This facilitates resetting, or reactivating the tilt detector as described hereinbefore. The front surface 23 may be formed cooperatively with the remainder of the container 21 so as to form the baffle and the chamber described hereinbefore. As illustrated and in the preferred form the back of the container 21 will be formed as by molding, machining or the like and the front will comprise a planar piece of clear material. Typically, the container 21 and front 23 will be formed of a transparent plastic such as polyacrylate, polymethacrylate, polycarbonate, and the like. If desired, the back of the container may be formed of metal or plastic such as ABS, glass reinforced polyester, polypropylene, or TPX (methylpentane polymer). The transparent front will then be formed of material that can be readily bonded to the back. For example, where it is formed of the clear material such as polyacrylates, polymethacrylates, polycarbonates, and the like it may be ultrasonically welded or adhered, as by methylene chlorides solvent or the like, to the back of the container 21. Ordinarily the container is shipped without any of either the first fluid or the second mass disposed therewithin where the first fluid will be a liquid and the second mass will be a gas. Syringes may be supplied with the correct amount of liquid and second mass and injected through an injection hole which is thereafter sealed when the tilt detector is ready to be used. On the other hand, where the first fluid is a gas and the second fluid is a solid mass such as a disk, small pellets or the like, the tilt detector 13 may be completely assembled and shipped in the assembled condition.

As indicated, when bubbles are employed, the bubbles may be air or an injected gas. It is preferred to have smaller bubbles to prevent partial resetting as can occur with larger bubbles. As indicated this is one advantage of the platform in that it enlarges the relatively smaller bubbles when trapped within the baffle 19.

Since the tilt detector will be affixed to a container, it is preferable to employ a means of readily affixing it to the container. While these means may be commensurate with the type of container, universality is achieved by employing a peel off strip with an adhesive on the back of the tilt detectors. In this way, the strip is simply peeled off and the tilt detector affixed firmly to the container. Other methods may be employed as desired. For example, hooks and brackets may be affixed respectively to the tilt detector and the shipping package 11. To prevent correcting any indication of too much tilt, however, it is preferable that the affixing of the tilt detector be relatively permanent or at least afford an indication of its having been removed. This can be done, of course, in several ways such as with seals through protrusions from the shipping package 11 through apertures in the tilt detector. Ordinarily, however, the adhesives that are employed on the back of the tilt detector can be made so strong as to peel off sections of the package container if the tilt detector is removed, thereby affording an indication of tampering.

The following examples demonstrate workable tilt detectors that have been made.

EXAMPLE 1

A container of Lexan plastic (polycarbonate) was formed with a semicircle of about 0.15 inch inside the inner apex of the baffle with a neck of about 0.15 inch length. The neck terminated exteriorly toward the open end of the baffle in a section inclined about 45° with respect to the central axis. The angle formed by the sides 29 was about 70° to give a tipping angle of about 68°–71° for escape of the bubble of gas (air) in the liquid. The liquid employed was, in one case, ethanol which was dyed with commercial red dye; and, in another case, aqueous solution of ethylene glycol dyed with red dye. The transparent front 23 was affixed to the back of the container with methylene chloride. An injection hole at the top of the container with the horseshoe shaped baffle opening downwardly allowed injection of the liquid and the air bubble of appropriate volume. The tilt detector thus formed worked satisfactorily although the liquid tended to invade the interstices of the plastic over a protracted interval of time.

EXAMPLE 2

The same container with chamber about the baffle was employed but the liquid employed was Fluorinert. It was found that it was difficult to introduce dye successfully into the Flourinert because of its inert character. The bubble was clearly visible, however and the tilt detector worked satisfactorily. The critical angle was found to be about 69° whereas the calculated was 70°.

The overall dimensions of the tilt detector was about 1.6 inch by 1.6 inch with a thickness of the cavity about 0.08 inch. The diameter of the air bubble in the chamber was 0.113 inch and it was increased by about 40% when entrapped above the platform interiorly of the baffle. The overall dimensions of the cavity were such as to afford clearance between the walls of the cavity and the ends of the baffle of about 0.225 inch with an overall radius of the arcuate bottom of the cavity from the center of the semicircle of the inner apex was about 0.925 inch.

Figure 4:
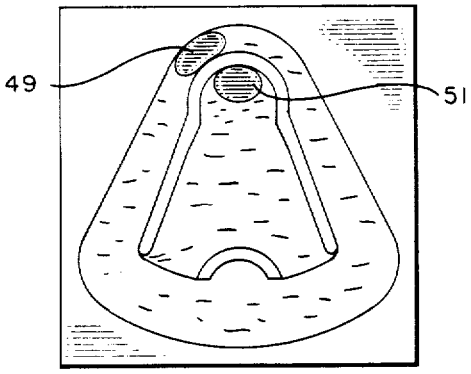
FIG. 4 is a front elevational view of the embodiment of FIG. 2 in which a portion of the bubble has escaped the baffle and a portion remains within the trapping end of the baffle.
Figure 5:
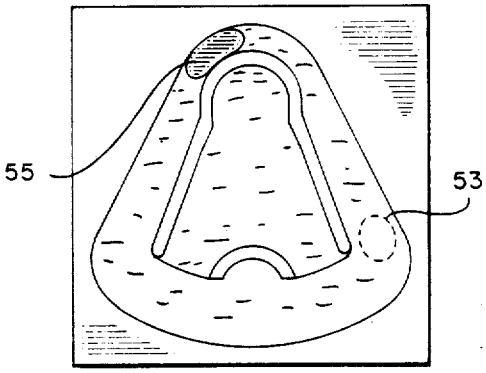
FIG. 5 is a front elevational view of another embodiment of this invention in which the bubble has completely escaped and traverses around the periphery of the chamber of the container.
Figure 7:
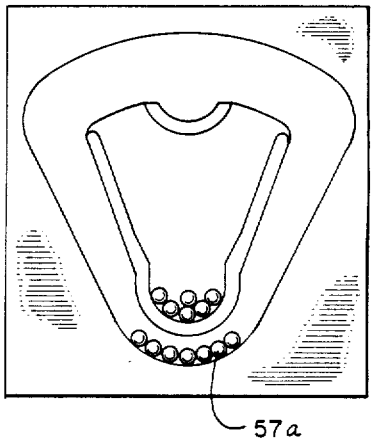
FIG. 7 shows the embodiment of FIG. 6 in which a portion of the pellets have been freed from the baffle.
Figure 8:
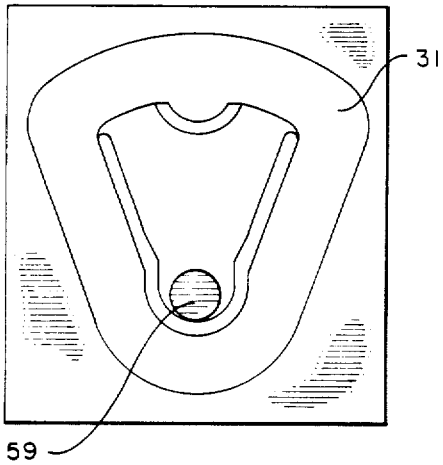
FIG. 8 is a front elevational view of an embodiment of this invention in which a disk is more dense than the fluid within the chamber.

A variety of other embodiments are shown. For example, FIGS. 4 and 5 show the embodiment of FIGS. 2 and 3 wherein, in FIG. 4, a portion 49 of the bubble has escaped while a small remainder bubble 51 remains. In FIG. 5, on the other hand, the entire bubble 55 will have escaped and is traversing the raceway. The bubble is shown in dashed lines 53 and finally in the at rest position 55 in solid lines. In FIG. 6, there are a plurality of small pellets 57 that are more dense than the fluid in the chamber 31. In FIG. 7, the escaped pellets 57a indicate that too much tilt has been given the tilt detector. In FIG. 8, a solid disk 59 that is more dense than the fluid in the chamber 31 is indicated.

Figure 9:
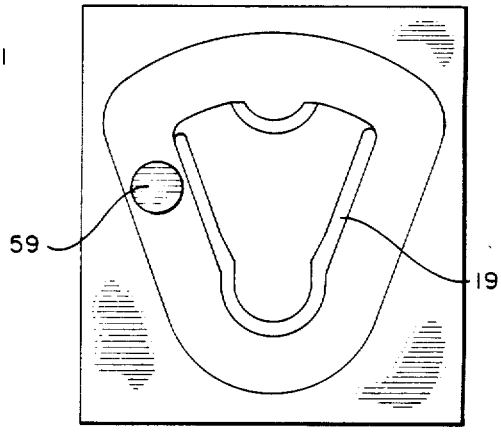
FIG. 9 is a front elevational view of the embodiment of FIG. 8 in which the disk has escaped the baffle.
Figure 10:
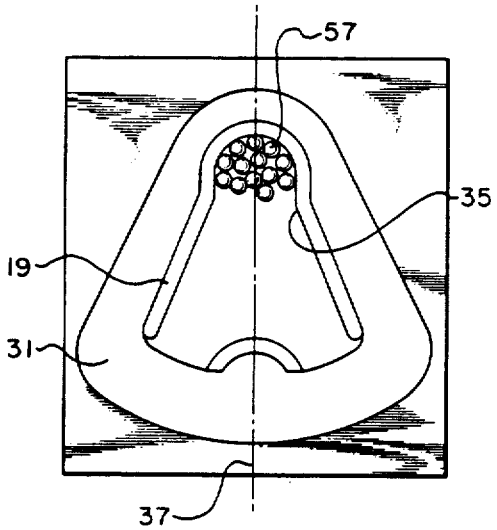
*FIG. 10 is an embodiment of the tilt detector in which a plurality of small pellets are less dense than the fluid in the chamber.*
Figure 11:
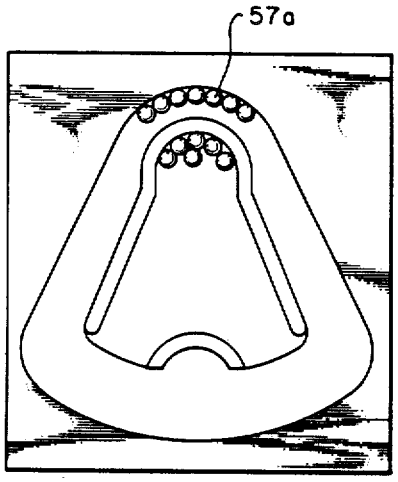
*FIG. 11 shows the embodiment of FIG. 10 in which a portion of the pellets have been freed from the baffle.*

In FIG. 9, the solid disk 59 will have escaped by too much tilt having been given the tilt detector. Obviously, if the small pellets 57 or disk 59 are less dense than the fluid, as can be achieved by impermeable plastic foams in a liquid such as an aqueous solution of antifreeze or the like, the baffle 19 would be in its normal position opening downwardly, *as indicated in FIGS. 10 and 11*, instead of in the inverted position indicated in FIG. 6–9.

Although the invention has been described with a certain degree of particularity, it is understood that the present disclosure is made only by way of example and that numerous changes in the details of construction and the combination and arrangement of parts may be resorted to without departing from the spirit and the scope of the invention, a reference for the latter being had to the appended claims.

What is claimed is:

1. A tilt detector for accompanying goods to be transported to determine whether said good have been transported in a recommended position without being inclined beyond a predetermined angle comprising:

a. a first fluid of a first density;

b. a second mass of a second density less than said first density;

c. a horseshoe-shaped baffle with a trapping end in the form of an inner apex for trapping said second mass under the buoyant force of gravity when in a vertical position with its open end in the opposite direction such that at least part of said second mass is freed to move out of said baffle when tilted beyond a pre-determined angle of tilt; the degre of the sides of said baffle being related to said predetermined angle;

d. a thin container having at least a transparent window for viewing at least said trapping end for ascertaining if said second mass has been freed;

such that said tilt detector can be affixed to goods, containers and the like to tell if they have been tilted too much during transportation and the like; said tilt detector being resettable by inverting to replace said less dense second mass within said horseshoe-shaped baffle.

2. The tilt detector of claim 1 wherein said transparent window is sufficiently large such that both said fluid and said mass are visible.

3. The tilt detector of claim 1 wherein said fluid is a liquid, said liquid is dyed for greater visibility and a chamber surrounds said baffle, said transparent window being large enough for visibility of said dyed liquid for determining the position of said second mass.

4. The tilt detector of claim 1 wherein said second mass comprises a plurality of small pellets.

5. The tilt detector of claim 1 wherein said tilt detector is employed in conjunction with another tilt detector on goods with the angle between the tilt detectors in their vertical position at about 90° such that if one tilt detector is activated by having been tilted too much, it cannot be reset without tilting the other detector too much.

6. The tilt detector of claim 1 wherein said fluid is a liquid, and said baffle has its inner apex at its top end in its vertical operating position for holding said second mass with its open end opening downwardly in operational installation.

7. The tilt detector of claim 6 wherein said second mass is a gas bubble within said liquid.

8. The tilt detector of claim 7 wherein said baffle is disposed within a chamber in said container, said chamber sealingly holding said liquid; said baffle having its dimensions in thickness less than the dimensions of said chamber and having an elevated portion to prevent entry of said bubble into said liquid without careful emplacement from a generally horizontal position of said container whereby said bubble, once freed from said baffle traverses around the periphery of said chamber to afford an indication of tilt beyond said pre-determined angle.

9. The tilt detector of claim 7 wherein said liquid is ethyl alcohol and said second mass is an air bubble within said ethyl alcohol.

10. The tilt detector of claim 7 wherein said liquid is a dyed aqueous solution and said second mass is an air bubble within said dyed aqueous solution.

11. A combination enabling a recipient of transported goods in a container to determine whether said goods have been transported in a recommended position without having been inclined at an angle greater than a pre-determined angle comprising the combination of:

a. a goods container having the goods therewithin; a pair of tilt detectors mounted on the exterior of said container for being read rapidly by the recipient; said tilt detectors affording an indication if a tilt beyond the pre-determined andle has been experienced by said container; each said tilt detector consisting essentially of:

i. a first fluid of a first density;

ii. a second mass of a second density less than said first density;

iii. a horseshoe-shaped baffle with a trapping end in the form of an inner apex for trapping said second mass under the buoyant force of gravity since the relative buoyancy of said second mass keeps it trapped when oriented correctly; said horseshoe-shaped baffle having its open end opening in the direction opposite its trapping end such that at least part of said second mass is freed to move out of said baffle when said container is tilted beyond a pre-determined angle of tilt; the degree of the sides of said baffle being related to said pre-determined angle;

iv. a thin container having at least a transparent window for viewing at least said trapping end of said horseshoe-shaped baffle for ascertaining if said second mass has been freed;

such that the recipient can rapidly view the tilt detectors to tell if said container of goods has been tilted too much; said tilt detectors being resettable when individually removed from said container by individually being inverted to replace said second mass within said horseshoe-shaped baffle of each said tilt detector.

*12. A tilt detector for accompanying goods to be transported to determine whether said goods have been transported in a recommended position without being inclined beyond a predetermined angle comprising:*

*a. a thin container having front and back walls and defining a chamber;*

*b. a first fluid of a first density substantially filling said chamber;*

*c. a second mass of a second density different from said first density so as to respond to gravitational force when allowed to do so;*

*d. a horseshoe-shaped baffle extending between and engaging said front and back wall so as to hold said second mass within a trapping end in the form of an inner apex for trapping said second mass under the force of gravity when in a vertical position with its open end in the opposite direction such that at least part of said second mass is free to move out of said baffle when tilted beyond a pre-determined angle of tilt, the degree of the sides of said baffle being related to said predetermined angle;*

*said thin container having at least a transparent window for viewing at least said trapping end of said horseshoe-shaped baffle for ascertaining if said second mass has been freed by being tilted too much such that said tilt detector can be affixed to goods, containers and the like to tell if they have been tilted too much during transportation and the like; said tilt detector being resettable by inverting to replace said second mass within said horseshoe-shaped baffle.*

*13. The tilt detector of claim 12 wherein said first fluid is a gas, said second mass is more dense than said gas, said baffle has its inner apex at its bottom end and its vertical operating position for holding said second mass within its open end opening upwardly in operational installation.*

*14. The tilt detector of claim 13 wherein said fluid is air and said second mass is a disc that slides around within said containers and is held in position in said trapping end of said horseshoe-shaped baffle before being tilted too much.*

*15. The tilt detector of claim 12 wherein said second mass comprises a plurality of small pellets.*

*16. The tilt detector of claim 15 wherein said small pellets are more dense than said fluid.*

*17. The tilt detector of claim 15 wherein said fluid is a liquid, said second mass is more dense than said liquid, said baffle has its inner apex at its bottom in its vertical operational position for holding said second mass and has its open end opening upwardly in operational installation.*

* * * * *